(12) United States Patent
Hirano et al.

(10) Patent No.: US 10,643,762 B2
(45) Date of Patent: May 5, 2020

(54) INSULATED WIRE AND CABLE

(71) Applicant: Hitachi Metals, Ltd., Tokyo (JP)

(72) Inventors: Koki Hirano, Hitachinaka (JP);
Masafumi Kaga, Hitachi (JP);
Tamotsu Kibe, Hitachi (JP); Seiichi Kashimura, Hitachi (JP); Makoto Iwasaki, Hitachi (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 15/621,669

(22) Filed: Jun. 13, 2017

(65) Prior Publication Data

US 2017/0365373 A1 Dec. 21, 2017

(30) Foreign Application Priority Data

Jun. 17, 2016 (JP) .................................. 2016-120347
Jun. 17, 2016 (JP) .................................. 2016-120682

(51) Int. Cl.
| H01B 7/00 | (2006.01) |
| H01B 3/10 | (2006.01) |
| H01B 7/29 | (2006.01) |
| H01B 3/44 | (2006.01) |
| H01B 7/02 | (2006.01) |
| H01B 7/282 | (2006.01) |

(52) U.S. Cl.
CPC .............. *H01B 3/10* (2013.01); *H01B 3/441* (2013.01); *H01B 7/02* (2013.01); *H01B 7/2825* (2013.01); *H01B 7/292* (2013.01); *Y02A 30/14* (2018.01)

(58) Field of Classification Search
CPC ........................................................ H01B 7/02
USPC ................ 174/110 R, 102 R, 120 R, 120 SR
See application file for complete search history.

(56) References Cited

U.S. PATENT DOCUMENTS

| 3,333,049 A * | 7/1967 | Humphrey ........... H01B 7/0036 |
| | | 174/102 SC |
| 5,912,436 A * | 6/1999 | Sanchez ................. H01B 3/441 |
| | | 174/121 A |
| 2002/0046871 A1* | 4/2002 | Goeblmaier ......... H01B 7/0258 |
| | | 174/121 A |
| 2004/0216914 A1* | 11/2004 | Vexler .................... H01B 3/441 |
| | | 174/121 A |

(Continued)

FOREIGN PATENT DOCUMENTS

| JP | S52-113389 U | 8/1977 |
| JP | SSZ-113389 | 8/1977 |

(Continued)

OTHER PUBLICATIONS

Extended European Search Report dated Dec. 1, 2017 in European Application No. 17175941.8.

(Continued)

*Primary Examiner* — William H. Mayo, III
(74) *Attorney, Agent, or Firm* — McGinn IP Law Group, PLLC (57) ABSTRACT

An insulated wire includes a conductor, a flame-retardant inner layer that is provided around the conductor and includes a metal hydroxide, and a water ingress prevention layer provided around the flame-retardant inner layer. The insulated wire may further include a flame-retardant outer layer provided around the water ingress prevention layer.

20 Claims, 1 Drawing Sheet

(56) References Cited

U.S. PATENT DOCUMENTS

| | | | |
|---|---|---|---|
| 2008/0050590 A1* | 2/2008 | Rodway | H01B 3/105 |
| | | | 428/394 |
| 2008/0073105 A1* | 3/2008 | Clark | H01B 7/0216 |
| | | | 174/112 |
| 2010/0078196 A1* | 4/2010 | McLaughlin | H01B 7/0216 |
| | | | 174/120 SR |
| 2010/0116548 A1 | 5/2010 | Nonaka | |
| 2010/0219555 A1* | 9/2010 | Mehan | B29C 47/0023 |
| | | | 264/173.12 |
| 2013/0228358 A1 | 9/2013 | Fujimoto et al. | |
| 2014/0102752 A1 | 4/2014 | Ushiwata et al. | |
| 2014/0166339 A1* | 6/2014 | Bates | H01B 7/295 |
| | | | 174/120 R |
| 2015/0371735 A1 | 12/2015 | Iwasaki et al. | |

FOREIGN PATENT DOCUMENTS

| | | | | |
|---|---|---|---|---|
| JP | S61-253719 | | 11/1986 | |
| JP | 03-236108 A | * | 10/1991 | H01B 3/44 |
| JP | H4-126621 U | | 11/1992 | |
| JP | 6-52727 A | * | 2/1994 | H01B 7/34 |
| JP | 2002-203434 A | | 7/2002 | |
| JP | 2007-161960 A | | 6/2007 | |
| JP | 2008-277142 A | | 11/2008 | |
| JP | 2013-214487 A | | 10/2013 | |
| JP | 2014-082083 A | | 5/2014 | |
| JP | 2016-21360 A | | 2/2016 | |
| WO | WO 2013/030795 A1 | | 3/2013 | |

OTHER PUBLICATIONS

Japanese Office Action dated Dec. 12, 2017 in Japanese Application No. 2016-120682 with an English translation thereof.
Japanese Office Action dated Oct. 3, 2017 in Japanese Application No. 2019-120682 with and English translation thereof.
Japanese Office Action dated Mar. 9, 2018 in corresponding Japanese Application No. 2016-120347 with an English translation thereof.
Japanese Office Action dated Dec. 25, 2018, in Japanese Patent Application No. 2018-042459 with an English translation.
Chinese Office Action dated Jun. 28, 2019, in Chinese Patent Application No. 201710389895.6 with an English translation.
European Office Action dated Aug. 13, 2019, in European Patent Application No. 17 175 941.8-1105.
Chinese Office Action dated Mar. 5, 2020, in Chinese Patent Application No. 201710389895.6 and English translation thereof.

* cited by examiner

INSULATED WIRE AND CABLE

BACKGROUND OF THE INVENTION

1. Field of the Invention

The invention relates to an insulated wire and a cable.

2. Description of the Related Art

Insulated wires used for internal wiring of electronic devices are required to have flame retardancy enough to prevent fire from spreading along the wires in the event that the devices ignite. The criteria for flame retardancy of internal wiring material are specified by UL 758 standard (USA), etc.

Meanwhile, in Europe which has a well-developed railway system, a regional uniform standard called EN standard (European standard) has been widely adopted, and materials to be used need to have abrasion resistance, hydrolysis resistance, flame retardancy, heat resistance, low smoke emission and electrical characteristics (DC stability).

To meet such standard requirements, flame-retardant resin compositions containing a metal hydroxide such as magnesium hydroxide or aluminum hydroxide are conventionally used for electric wires and cables, etc. (see, e.g., JP-A-2013-214487).

JP-A-2013-214487 discloses a multilayer insulated wire provided with a conductor, an inner layer provided on the conductor and formed by applying a resin composition containing at least 10 to 100 parts by weight of calcined clay with respect to 100 parts by weight of a base polymer consisting mainly of modified poly(2,6-dimethyl phenylene ether), and an outer layer further provided on the inner layer and formed by applying a polyester resin composition containing 5 to 150 parts by weight of polyester block copolymer, 0.5 to 3 parts by weight of hydrolyzable inhibitor and 10 to 30 parts by weight of magnesium hydroxide with respect to 100 parts by weight of a base polymer consisting mainly of a polyester resin.

SUMMARY OF THE INVENTION

Flame-retardant layers containing a large amount of metal hydroxide as a flame retardant are likely to electrically break down due to water absorption and do not serve as electrical insulating layers. It is therefore necessary to provide an electrical insulating layer as an inner layer.

Also, particularly, diameter reduction of insulated wires and cables is required, but it is difficult to meet the requirement for diameter reduction in the above-described conventional structure.

On the other hand, in recent years, insulated wires are required to have a smaller diameter in view of weight reduction. To meet such requirement, it is suggested to reduce the thickness of the inner insulation layer or the outer flame-retardant layer.

However, when the thickness of the flame-retardant layer is reduced, it is difficult to maintain high flame retardancy. On the other hand, when the thickness of the insulation layer is reduced, insulation reliability decreases and it is difficult to maintain high DC stability. Meanwhile, engineering plastics such as modified poly(2,6-dimethyl phenylene ether) are very expensive materials. In other words, it is difficult to provide a low-cost insulated wire having a reduced outer diameter while maintaining high flame retardancy and high DC stability.

It is an object of the invention to provide an insulated wire and a cable that can have a reduced outer diameter even when having a flame-retardant layer containing a large amount of metal hydroxide as a flame retardant. Also, it is another object of the invention to provide an insulated wire and a cable that can have a reduced outer diameter and manufactured at a low cost while satisfying high flame retardancy and high DC stability.

According to embodiments of the invention, an insulated wire (or multilayer insulated wire) and a cable defined by [1] to [12] below can be provided.

[1] An insulated wire, comprising:
 a conductor;
 a flame-retardant inner layer that is provided around the conductor and comprises a metal hydroxide; and
 a water ingress prevention layer provided around the flame-retardant inner layer.

[2] The insulated wire according to [1], further comprising a flame-retardant outer layer provided around the water ingress prevention layer.

[3] The insulated wire according to [2], wherein the flame-retardant outer layer comprises a metal hydroxide.

[4] The insulated wire according to any one of [1] to [3], wherein the water ingress prevention layer comprises a mineral film having a thickness of less than 5 μm.

[5] The insulated wire according to any one of [1] to [3], wherein the water ingress prevention layer comprises a metal film having a thickness of less than 5 μm.

[6] The insulated wire according to any one of [1] to [3], wherein the water ingress prevention layer comprises a high-density polymer film or low-density polymer film that has a thickness of not less than 10 μm and not more than 200 μm.

[7] A cable, comprising the insulated wire according to any one of [1] to [6].

[8] A multilayer insulated wire, comprising:
 a conductor;
 a flame-retardant inner layer that is provided around the conductor and comprises a metal hydroxide;
 a water ingress prevention layer provided around the flame-retardant inner layer; and
 a flame-retardant outer layer provided around the water ingress prevention layer,
 wherein the flame-retardant outer layer and the flame-retardant inner layer comprise a resin composition mainly comprising a polyolefin, and
 wherein the water ingress prevention layer comprises a resin composition mainly comprising a polyethylene.

[9] The multilayer insulated wire according to [8], wherein an outer diameter of the conductor is not less than 1.20 mm and not more than 5.5 mm.

[10] The multilayer insulated wire according to [8] or [9], wherein a total thickness of the flame-retardant inner layer, the water ingress prevention layer and the flame-retardant outer layer is not less than 0.4 mm and not more than 0.65 mm.

[11] The multilayer insulated wire according to any one of [8] to [10], wherein a DC stability thereof is satisfied such that short circuit does not occur even after applying DC voltage in salt water at 85° C. for 240 hours in accordance with EN 50305.6.7, and
 wherein a flame retardancy thereof is satisfied such that fire is extinguished within 60 seconds after removal of flame in the flame retardant test in accordance with EN 60332-1-2.

[12] A cable, comprising the multilayer insulated wire according to any one of [8] to [11].

Effects of the Invention

According to an embodiment of the invention, an insulated wire and a cable can be provided that can have a reduced outer diameter even when having a flame-retardant layer containing a large amount of metal hydroxide as a flame retardant. Also, according to another embodiment of the invention, an insulated wire and a cable can be provided that can have a reduced outer diameter and manufactured at a low cost while satisfying high flame retardancy and high DC stability.

BRIEF DESCRIPTION OF THE DRAWING

Next, the present invention will be explained in more detail in conjunction with appended drawing, wherein.

DETAILED DESCRIPTION OF THE PREFERRED EMBODIMENTS

First Embodiment

Insulated Wire

Figure 1:
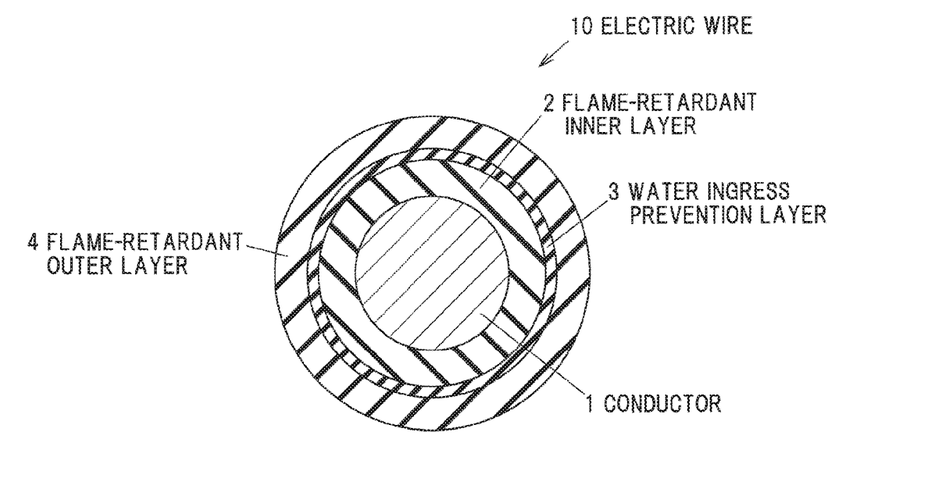
FIG. 1 is a cross sectional view showing an example of an insulated wire in the first and second embodiments of the present invention.

An insulated wire in the first embodiment of the invention is provided with a conductor, a flame-retardant inner layer which is provided around the conductor and contains a metal hydroxide, and a water ingress prevention layer provided around the flame-retardant inner layer.

FIG. 1 is a cross sectional view showing an example of an insulated wire in the first embodiment of the invention.

As shown in FIG. 1, an insulated wire 10 in the first embodiment is provided with a conductor 1, a flame-retardant inner layer 2 which is provided around the conductor 1 and contains a metal hydroxide, and a water ingress prevention layer 3 provided around the flame-retardant inner layer 2. It is preferable that a flame-retardant outer layer 4 be further provided around the water ingress prevention layer 3.

Conductor 1

The conductor 1 is formed of a widely-used material, e.g., pure copper, tin-plated copper or aluminum, etc. The conductor 1 is not limited to a solid wire as shown in FIG. 1, and may be formed by twisting plural strands together. For example, a tin-plated soft copper twisted wire can be suitably used. The conductor 1 used here can be, e.g., a conductor having an outer diameter of 0.15 to 7 mm.

Flame-Retardant Inner Layer 2

The flame-retardant inner layer 2 contains a metal hydroxide as a flame retardant.

Examples of the metal hydroxide include magnesium hydroxide, aluminum hydroxide, hydrotalcite, calcium aluminate hydrate, calcium hydroxide and barium hydroxide, etc.

The metal hydroxide content is preferably not less than 80 parts by mass and not more than 250 parts by mass, more preferably not less than 150 parts by mass and not more than 250 parts by mass, with respect to 100 parts by mass of a base polymer constituting the flame-retardant inner layer 2.

The base polymer constituting the flame-retardant inner layer 2 can be formed of a widely-used material, e.g., vinyl chloride resin, fluorine resin or polyolefin such as polyethylene.

Examples of the vinyl chloride resin include vinyl chloride homopolymer (i.e., polyvinyl chloride), a copolymer of vinyl chloride and another copolymerizable monomer (e.g., vinyl chloride-vinyl acetate copolymer), and a mixture thereof. A mixture of two or more types of vinyl chloride resins with different polymerization degrees may be used, if required.

As the fluorine resin, it is possible to use tetrafluoroethylene-perfluoroalkyl vinyl ether copolymer (PFA), tetrafluoroethylene-hexafluoropropylene copolymer (FEP), polytetrafluoroethylene (PTFE), ethylene-tetrafluoroethylene hexafluoropropylene copolymer (EFEP) and ethylene-tetrafluoroethylene copolymer (ETFE), etc., which can be used alone or in combination thereof. These fluorine resins are desirably cross-linked.

Examples of the polyolefin include polyethylene and polypropylene, etc.

To the base polymer constituting the flame-retardant inner layer 2, it is possible, if necessary, to add additives such as another flame retardant, flame-retardant aid, filler, cross-linking agent, crosslinking aid, plasticizer, stabilizer, ultraviolet absorber, light stabilizer, lubricant, antioxidant, colorant, processability improver, inorganic filler, compatibilizing agent, foaming agent and antistatic agent, etc.

The flame-retardant inner layer 2 can be formed by, e.g., applying the base polymer mixed with a metal hydroxide-based filler to the outer surface of the conductor 1 using a molding method such as extrusion coating. After that, cross-linking may be performed by electron beam irradiation, etc.

The thickness of the flame-retardant inner layer 2 is preferably, e.g., not less than 30 μm and not more than 300 μm.

In the first embodiment, the flame-retardant inner layer 2 may be configured as a single layer or may have a multilayer structure. A separator or a braid, etc., may be further provided, if required.

Water Ingress Prevention Layer 3

The water ingress prevention layer 3 provided around the flame-retardant inner layer 2 has a function of preventing water ingress from the outside to the flame-retardant inner layer 2. For example, it is preferable to select a materials and a layer thickness which provide a moisture vapor transmission rate of not more than 50 $g \cdot m^{-2} \cdot day$ as measured by a moisture sensor (the Lyssy method) in accordance with JIS K 7129, more preferably not more than 40 $g \cdot m^{-2} \cdot day$, further preferably not more than 30 $g \cdot m^{-2} \cdot day$.

The material, etc., of the water ingress prevention layer 3 is not specifically limited as long as the above-mentioned function is exerted, but the water ingress prevention layer 3 is preferably formed of, e.g., a mineral film, a metal film, a high-density polymer film or a low-density polymer film, which can be used alone or in combination of two or more.

The mineral film is formed of, e.g., $SiO_2$, $Al_2O_3$ or $TiO_2$. The thickness of the mineral film is preferably less than 5 μm, more preferably not more than 1 μm, further preferably not more than 0.3 μm, and the most preferably not more than 0.15 μm. Meanwhile, the lower limit of the film thickness is preferably not less than 10 nm, more preferably not less than 30 nm, further preferably not less than 50 nm, and the most preferably not less than 70 nm. When the film thickness is not less than 5 μm, the wire or cable does not have sufficient flexibility and also the film may come off.

The mineral film is produced from, e.g., inorganic alkoxy such as alkoxysilane. The mineral film can be provided by spraying a material onto the outer surface of the flame-retardant inner layer 2.

The metal film is formed of, e.g., Au, Ag, Cu, Al, Ni or Sn. The preferable film thickness is the same as the mineral film. When the film thickness is not less than 5 μm, the wire or cable does not have sufficient flexibility and also the film may come off.

The metal film is formed by, e.g., sputtering. Alternatively, the metal film can be formed by electroless plating.

The high-density polymer film is formed of, e.g., high-density polyethylene (HDPE), polytetrafluoroethylene (PTFE) or chlorine-based resin. The low-density polymer film is formed of, e.g., low-density polyethylene (LDPE). The thickness of the high-density polymer film and the low-density polymer film is preferably not less than 10 μm and not more than 200 μm, more preferably not less than 30 μm and not more than 180 μm, and further preferably not less than 50 μm and not more than 150 μm.

The high-density polymer film can be formed by extrusion coating, or alternatively may be formed by winding a high-density polymer tape.

Flame-Retardant Outer Layer 4

The flame-retardant outer layer 4 preferably contains a metal hydroxide as a flame retardant.

Those listed previously can be used as the metal hydroxide.

The metal hydroxide content is preferably not less than 80 parts by mass and not more than 250 parts by mass, more preferably not less than 150 parts by mass and not more than 250 parts by mass, with respect to 100 parts by mass of a base polymer constituting the flame-retardant outer layer 4.

Those listed previously as the base polymer of the flame-retardant inner layer 2 can be used as the base polymer constituting the flame-retardant outer layer 4.

The flame-retardant outer layer 4 is preferably formed of the same resin composition as the flame-retardant inner layer 2.

The flame-retardant outer layer 4 can be formed by, e.g., applying the base polymer mixed with a metal hydroxide-based filler to the outer surface of the water ingress prevention layer 3 using a molding method such as extrusion coating. After that, cross-linking may be performed by electron beam irradiation, etc.

The thickness of the flame-retardant outer layer 4 is preferably, e.g., not less than 50 μm and not more than 450 μm. Since the total thickness of the flame-retardant inner layer 2 and the flame-retardant outer layer 4 only needs to be about the same as a flame-retardant layer of conventional insulated wire and also it is not necessary to separately provide an electrical insulating layer, the insulated wire 10 in the first embodiment can be suitably reduced in diameter.

In the first embodiment, the flame-retardant outer layer 4 may be configured as a single layer or may have a multilayer structure. A separator or a braid, etc., may be further provided, if required.

The insulated wire 10 may have another layer in addition to the above-described layers as long as the effects of the invention can be obtained. For example, an electrical insulating layer formed of polyethylene, etc., and not containing a flame retardant may be provided between the conductor 1 and the flame-retardant inner layer 2 or between the flame-retardant inner layer 2 and the water ingress prevention layer 3. However, preferably, such layer is not provided in view of diameter reduction. If provided, the layer thickness is preferably not more than 300 μm, more preferably not more than 200 μm, and further preferably not more than 150 μm.

Cable

A cable in the first embodiment of the invention is characterized by having the insulated wire in the first embodiment of the invention.

The cable in the first embodiment is provided with, e.g., the insulated wire 10 and a sheath formed therearound by extrusion. The core may be a multi-core twisted wire formed of plural insulated wires 10.

Effects of the First Embodiment of the Invention

In the first embodiment of the invention, since providing the water ingress prevention layer 3 and arranging the flame-retardant inner layer 2 thereinside allow the flame-retardant inner layer 2 to also serve as an electrical insulating layer, it is not necessary to separately provide an electrical insulating layer. Therefore, it is possible to provide an insulated wire and a cable that have a flame-retardant layer containing a large amount of metal hydroxide as a flame retardant but can be reduced in diameter.

Examples

The invention will be described in more detail below based on Examples and Comparative Example. However, the invention is not limited thereto.

The electric wires 10 having the structure shown in FIG. 1 were made by the following method and were evaluated.

Manufacturing of Insulated Wire

Using a 40-mm extruder, the flame-retardant inner layer 2 was applied to cover the outer surface of a tin-plated conductor having an outer diameter of 1.23 mm (a twisted conductor formed by twisting thirty-seven 0.18 mm-diameter strands), the water ingress prevention layer 3 was applied to cover the flame-retardant inner layer 2, and the flame-retardant outer layer 4 was then applied to cover the water ingress prevention layer 3. The material used to form the flame-retardant inner layer 2 and the flame-retardant outer layer 4 was a resin composition formed by mixing the components shown in Table 1. The material used to form the water ingress prevention layer 3 was a resin composition formed by mixing and kneading 100 parts by mass of high-density polyethylene (product name: Hi-ZEX (trade name) 5305E, MFR: 0.8 g/10 min, density: 0.951/cm$^3$, manufactured by Prime Polymer Co., Ltd.) and 1 part by mass of hindered phenol antioxidant (product name: Irganox1010, manufactured by BASF) for Examples 1 to 4, 7 and 8, and a resin composition formed by mixing and kneading 100 parts by mass of low-density polyethylene (product name: UBE Polyethylene (trade name) UBE C450, MFR: 1 g/10 min, density: 0.921/cm$^3$, manufactured by Ube Maruzen Polyethylene Co., Ltd.) and 1 part by mass of hindered phenol antioxidant (product name: Irganox1010, manufactured by BASF) for Examples 5 and 6. Each layer was molded so as to have the thickness shown in Table 2.

TABLE 1

Flame-retardant inner layer 2 and flame-retardant outer layer 4

| | | Mixed amount (parts by mass) | |
|---|---|---|---|
| | Materials | Examples 1 to 6 | Examples 7 and 8 |
| Polymer | Eva Flex EV260, VA content 28%, MFR = 6, manufactured by Du Pont-Mitsui Polychemicals | 70 | 70 |
| | Eva Flex 45X, VA content 46%, MFR = 100, manufactured by Du Pont-Mitsui Polychemicals | 15 | — |
| | TAFMER (trade name) MH7020 (Maleic anhydride-modified ethylene-butene copolymer), manufactured by Mitsui Chemicals | 15 | — |
| Flame retardant | H10A (Silane-treated magnesium hydroxide), manufactured by Albemarle | 80 | 40 |
| | H10C (Fatty acid -treated magnesium hydroxide), manufactured by Albemarle | 120 | 60 |
| Antioxidant | AO-18, mixed stock | 1 | 1 |
| Colorant | FT carbon | 2 | 2 |
| Lubricant | Zinc stearate | 1 | 1 |
| Total | | 304 | 174 |

TABLE 2

| | | Example 1 | Example 2 | Example 3 | Example 4 | Example 5 | Example 6 | Example 7 | Example 8 |
|---|---|---|---|---|---|---|---|---|---|
| Thickness of flame-retardant inner layer 2 | mm | 0.3 | 0.3 | 0.1 | 0.05 | 0.12 | 0.05 | 0.1 | 0.05 |
| Thickness of water ingress prevention layer 3 | mm | 0.11 | 0.18 | 0.11 | 0.12 | 0.11 | 0.12 | 0.12 | 0.14 |
| Thickness of flame-retardant outer layer 4 | mm | 0.1 | 0.1 | 0.3 | 0.4 | 0.31 | 0.415 | 0.315 | 0.41 |
| Outer diameter of insulated wire | mm | 2.25 | 2.39 | 2.25 | 2.37 | 2.31 | 2.40 | 2.30 | 2.43 |
| Moisture vapor transmission rate of water ingress prevention layer 3 | g·m$^{-2}$·day | 1.0 | 1.0 | 1.0 | 1.0 | 5.0 | 5.0 | 1.0 | 1.0 |
| DC stability test | Hour | Not less than 240 | Not less than 240 | Not less than 240 | Not less than 240 | Not less than 240 | Not less than 240 | Not less than 240 | Not less than 240 |
| Flame retardancy | VFT | ◉ | ◉ | ◉ | ◉ | ◉ | ◉ | ○ | ○ |
| | VTFT | ◉ | ○ | ◉ | ◉ | ○ | ○ | X | X |
| Overall evaluation | | ◉ | ◉ | ◉ | ◉ | ◉ | ◉ | ○ | ○ |

Measurement of Moisture Vapor Transmission Rate of Water Ingress Prevention Layer 3

Films corresponding to the water ingress prevention layers 3 of the respective Examples were made as measurement samples on plate glasses. The moisture vapor transmission rate was measured by a moisture sensor method (the Lyssy method) in accordance with JIS K 7129.

Evaluation of Insulated Wire

The obtained insulated wires were evaluated by the following methods. The Table 2 shows the evaluation results.

(1) Electrical Characteristics Test

A 300V DC stability test was conducted in accordance with EN 50305.6.7. The wires with no short-circuit for 240 hours were regarded as "Pass" and those short-circuited within 240 hours were regarded as "Fail".

(2) Flame-Retardant Test

Flame retardancy was evaluated by the following VFT and VTFT.

(VFT)

A vertical flame test (VFT) was conducted. 600 mm-long insulated wires were held vertical and a flame was applied thereto for 60 seconds. The wires passed the test (◉: excellent) when the fire was extinguished within 30 seconds after removing the flame, the wires passed the test (○: acceptable) when the fire was extinguished in not less than 30 seconds and not more than 60 seconds, and the wires failed the test (X) when the fire was not extinguished within 60 seconds.

(VTFT)

A vertical tray flame test (VTFT) was conducted based on EN 50266-2-4. In detail, seven 3.5-meter insulated wires were bundled into one, and eleven bundles were vertically arranged at equal intervals and were burnt from below for 20 minutes by a burner. The char length of not more than 2.5 m from the lower end after self-extinction was set as the target. The wires with a char length of not more than 1.5 m were regarded as "Pass (◉: excellent)", those with a char length of not less than 1.5 m and not more than 2.5 m were regarded as "Pass (○: acceptable)", and those with a char length of more than 2.5 m were regarded as "Fail (X)".

Overall Evaluation

The overall evaluation was rated as "Pass (◉)" when all evaluation results in the above-mentioned tests were "Pass", rated as "Pass (○)" when passed the DC stability test and VFT but failed VTFT, and rated as "Fail (X)" when failed any one of the DC stability test and VFT.

Second Embodiment

Insulated Wire

An insulated wire in the second embodiment of the invention is a multilayer insulated wire provided with a conductor, a flame-retardant inner layer which is provided around the conductor and contains a metal hydroxide, a water ingress prevention layer provided around the flame-retardant inner layer, and a flame-retardant outer layer provided around the water ingress prevention layer. The flame-retardant outer layer and the flame-retardant inner layer are formed of a resin composition consisting mainly of polyolefin, and the water ingress prevention layer is formed of a resin composition consisting mainly of polyethylene.

FIG. 1 is a cross sectional view showing an example of an insulated wire in the second embodiment of the invention.

As shown in FIG. 1, an insulated wire 10 in the second embodiment is provided with a conductor 1, a flame-retardant inner layer 2 which is provided around the conductor 1 and contains a metal hydroxide, a water ingress prevention layer 3 provided around the flame-retardant inner layer 2, and a flame-retardant outer layer 4 further provided around the water ingress prevention layer 3.

Conductor 1

The conductor 1 is formed of a widely-used material, e.g., pure copper, tin-plated copper, copper alloy, aluminum, gold or silver, etc. The conductor 1 is not limited to a solid wire as shown in FIG. 1, and may be formed by twisting plural strands together. For example, a tin-plated soft copper twisted wire can be suitably used. The conductor 1 used here can be, e.g., a conductor having an outer diameter of not less than 1.20 mm and not more than 5.5 mm, more preferably not less than 1.20 mm and not more than 2.0 mm.

Flame-Retardant Inner Layer 2

The flame-retardant inner layer 2 preferably contains a metal hydroxide as a flame retardant. In view of dispersibility, etc., the flame retardant can be surface-treated with a silane coupling agent, a titanate-based coupling agent or a fatty acid such as stearic acid.

Examples of the metal hydroxide include magnesium hydroxide, aluminum hydroxide, hydrotalcite, calcium aluminate hydrate, calcium hydroxide and barium hydroxide, etc.

The metal hydroxide content is preferably not less than 80 parts by mass and not more than 250 parts by mass, more preferably not less than 150 parts by mass and not more than 250 parts by mass, with respect to 100 parts by mass of a base polymer constituting the flame-retardant inner layer 2.

The base polymer constituting the flame-retardant inner layer 2 is formed of a widely-used material, e.g., vinyl chloride resin, fluorine resin or polyolefin such as polyethylene. The cost of the insulated wire is reduced by using such cheaper materials than those used for conventional insulated wires. The "resin composition consisting mainly of polyolefin" means that the largest proportion of the resin composition is polyolefin.

Examples of the vinyl chloride resin include vinyl chloride homopolymer (i.e., polyvinyl chloride), a copolymer of vinyl chloride and another copolymerizable monomer (e.g., vinyl chloride-vinyl acetate copolymer), and a mixture thereof. A mixture of two or more types of vinyl chloride resins with different polymerization degrees may be used, if required.

As the fluorine resin, it is possible to use tetrafluoroethylene-perfluoroalkyl vinyl ether copolymer (PFA), tetrafluoroethylene-hexafluoropropylene copolymer (FEP), polytetrafluoroethylene (PTFE), ethylene-tetrafluoroethylene hexafluoropropylene copolymer (EFEP) and ethylene-tetrafluoroethylene copolymer (ETFE), etc., which can be used alone or in combination thereof. These fluorine resins are desirably cross-linked.

Examples of the polyolefin include polyethylene and polypropylene, etc. Of those, polyethylene, ethylene-vinyl acetate copolymer, ethylene-ethyl acrylate copolymer, ethylene-butene acrylate copolymer and ethylene-methyl acrylate copolymer are preferably used alone or in combination so that a large amount of flame retardant can be added.

To the base polymer constituting the flame-retardant inner layer 2, it is possible, if necessary, to add additives such as another flame retardant, flame-retardant aid, filler, cross-linking agent, crosslinking aid, plasticizer, metal chelator, softener, reinforcing agent, surface active agent, stabilizer, ultraviolet absorber, light stabilizer, lubricant, antioxidant, colorant, processability improver, inorganic filler, compatibilizing agent, foaming agent and antistatic agent, etc.

The flame-retardant inner layer 2 can be formed by, e.g., applying the base polymer mixed with a metal hydroxide-based filler to the outer surface of the conductor 1 using a molding method such as extrusion coating. After that, cross-linking may be performed by electron beam irradiation, etc. There are also other applicable crosslinking methods such as chemical crosslinking using organic peroxide, sulfur compound or silane, etc., radiation crosslinking using exposure to radiation, and crosslinking using other chemical reaction.

The thickness of the flame-retardant inner layer 2 is preferably, e.g., not less than 30 µm and not more than 300 µm.

In the second embodiment, the flame-retardant inner layer 2 may be configured as a single layer or may have a multilayer structure. A separator or a braid, etc., may be further provided, if required.

Water Ingress Prevention Layer 3

The water ingress prevention layer 3 provided around the flame-retardant inner layer 2 has a function of preventing water ingress from the outside to the flame-retardant inner layer 2. For example, it is preferable to select a materials and a layer thickness which provide a moisture vapor transmission rate of not more than 50 $g \cdot m^{-2} \cdot day$ as measured by a moisture sensor method (the Lyssy method) in accordance with JIS K 7129, and polyethylene is used. The cost of the insulated wire is reduced by a cheap material such as polyethylene. The "resin composition consisting mainly of polyethylene" means that the largest proportion of the resin composition is polyethylene.

As the polyethylene, it is possible to use, e.g., high-density polyethylene (HDPE), low-density polyethylene (LDPE), medium-density polyethylene and linear low-density polyethylene which can be used alone or as a mixture of plural types. The thickness of the water ingress prevention layer is preferably not less than 10 µm and not more than 200 µm, more preferably not less than 30 µm and not more than 180 µm, and further preferably not less than 50 µm and not more than 150 µm.

The water ingress prevention layer can be formed by extrusion coating, or alternatively may be formed by winding a high-density polymer tape.

Flame-Retardant Outer Layer 4

The flame-retardant outer layer 4 preferably contains a metal hydroxide as a flame retardant.

Those listed previously can be used as the metal hydroxide.

The metal hydroxide content is preferably not less than 80 parts by mass and not more than 250 parts by mass, more preferably not less than 150 parts by mass and not more than 250 parts by mass, with respect to 100 parts by mass of a base polymer constituting the flame-retardant outer layer 4.

Those listed previously as the base polymer of the flame-retardant inner layer 2 can be used as the base polymer constituting the flame-retardant outer layer 4.

The flame-retardant outer layer 4 is preferably formed of the same resin composition as the flame-retardant inner layer 2.

The flame-retardant outer layer 4 can be formed by, e.g., applying the base polymer mixed with a metal hydroxide-based filler to the outer surface of the water ingress prevention layer 3 using a molding method such as extrusion coating. After that, cross-linking may be performed by electron beam irradiation, etc.

The thickness of the flame-retardant outer layer 4 is preferably, e.g., not less than 50 µm and not more than 450

µm. The total thickness of the flame-retardant inner layer 2, the water ingress prevention layer 3 and the flame-retardant outer layer 4 only needs to be about the same as a flame-retardant layer of conventional insulated wire, but is preferably not less than 0.4 mm and not more than 0.65 mm Unlike the conventional insulated wires, it is not necessary to separately provide an electrical insulating layer and the insulated wire 10 in the second embodiment can be suitably reduced in diameter.

In the second embodiment, the flame-retardant outer layer 4 may be configured as a single layer or may have a multilayer structure. A separator or a braid, etc., may be further provided, if required.

The insulated wire 10 may have another layer in addition to the above-described layers as long as the effects of the invention can be obtained. For example, an electrical insulating layer formed of polyethylene, etc., and not containing a flame retardant may be provided between the conductor 1 and the flame-retardant inner layer 2 or between the flame-retardant inner layer 2 and the water ingress prevention layer 3. However, preferably, such layer is not provided in view of diameter reduction. If provided, the layer thickness is preferably not more than 300 µm, more preferably not more than 200 µm, and further preferably not more than 150 µm.

Cable

A cable in the second embodiment of the invention is characterized by having the insulated wire in the second embodiment of the invention.

The cable in the second embodiment is provided with, e.g., the insulated wire 10 and a sheath formed therearound by extrusion. The core may be a multi-core twisted wire formed of plural insulated wires 10.

Effects of the Second Embodiment of the Invention

In the second embodiment of the invention, since providing the water ingress prevention layer 3 and arranging the flame-retardant inner layer 2 thereinside allow the flame-retardant inner layer 2 to also serve as an electrical insulating layer, it is not necessary to separately provide an electrical insulating layer which would be provided in the conventional insulated wires. Therefore, it is possible to provide an insulated wire and a cable that have a flame-retardant layer containing a large amount of metal hydroxide as a flame retardant but can be reduced in diameter.

Examples

The invention will be described in more detail below based on Examples and Comparative Example. However, the invention is not limited thereto.

The electric wires 10 having the structure shown in FIG. 1 were made by the following method and were evaluated.

Manufacturing of Insulated Wire

Using a 40-mm extruder, the flame-retardant inner layer 2 was applied to cover the outer surface of a tin-plated conductor having an outer diameter of 1.23 mm (a twisted conductor formed by twisting thirty-seven 0.18 mm-diameter strands), the water ingress prevention layer 3 was applied to cover the flame-retardant inner layer 2, and the flame-retardant outer layer 4 was then applied to cover the water ingress prevention layer 3. The material used to form the flame-retardant inner layer 2 and the flame-retardant outer layer 4 was a resin composition formed by mixing the components shown in Table 3. The material used to form the water ingress prevention layer 3 was a resin composition formed by mixing and kneading 100 parts by mass of high-density polyethylene (product name: Hi-ZEX (trade name) 5305E, MFR: 0.8 g/10 min, density: $0.951/cm^3$, manufactured by Prime Polymer Co., Ltd.) and 1 part by mass of hindered phenol antioxidant (product name: Irganox1010, manufactured by BASF) for Examples 9 to 12, 15 and 16, and a resin composition formed by mixing and kneading 100 parts by mass of low-density polyethylene (product name: UBE Polyethylene (trade name) UBE C450, MFR: 1 g/10 min, density: $0.921/cm^3$, manufactured by Ube Maruzen Polyethylene Co., Ltd.) and 1 part by mass of hindered phenol antioxidant (product name: Irganox1010, manufactured by BASF) for Examples 13 and 14. Each layer was molded so as to have the thickness shown in Table 4.

Meanwhile, in Comparative Example, a resin composition for forming insulation layer was prepared by mixing and kneading 100 parts by mass of clay, 7 parts by mass of crosslinking aid and 1.5 parts by mass of phenolic antioxidant. Also, a resin composition for forming flame-retardant layer was prepared by mixing and kneading 100 parts by mass of EVA1 and 200 parts by mass of magnesium hydroxide. Following this, the same twisted copper wire as that in Example 1 was prepared and a 0.3 mm-thick insulation layer was formed thereon by extruding the resin composition for forming insulation layer. Then, the resin composition for forming flame-retardant layer was extruded on the outer surface of the insulation layer and was cross-linked by electron beam irradiation, thereby forming a 0.4 mm-thick flame-retardant layer. An insulated wire having an outer diameter of 2.62 mm was thereby obtained.

TABLE 3

Flame-retardant inner layer 2 and flame-retardant outer layer 4

| | | Mixed amount (parts by mass) | |
|---|---|---|---|
| | Materials | Examples 9 to 14 | Examples 15 and 16 |
| Polymer | Eva Flex EV260, VA content 28%, MFR = 6, manufactured by Du Pont-Mitsui Polychemicals | 70 | 70 |
| | Eva Flex 45X, VA content 46%, MFR = 100, manufactured by Du Pont-Mitsui Polychemicals | 15 | — |
| | TAFMER (trade name) MH7020 (Maleic anhydride-modified ethylene-butene copolymer), manufactured by Mitsui Chemicals | 15 | — |
| Flame retardant | H10A (Silane-treated magnesium hydroxide), manufactured by Albemarle | 80 | 40 |
| | H10C (Fatty acid -treated magnesium hydroxide), manufactured by Albemarle | 120 | 60 |
| Antioxidant | AO-18, mixed stock | 1 | 1 |
| Colorant | FT carbon | 2 | 2 |
| Lubricant | Zinc stearate | 1 | 1 |
| Total | | 304 | 174 |

TABLE 4

|  |  | Example 9 | Example 10 | Example 11 | Example 12 | Example 13 | Example 14 | Example 15 | Example 16 |
|---|---|---|---|---|---|---|---|---|---|
| Thickness of flame-retardant inner layer 2 | mm | 0.3 | 0.3 | 0.1 | 0.05 | 0.12 | 0.05 | 0.1 | 0.05 |
| Thickness of water ingress prevention layer 3 | mm | 0.11 | 0.18 | 0.11 | 0.12 | 0.11 | 0.12 | 0.12 | 0.14 |
| Thickness of flame-retardant outer layer 4 | mm | 0.1 | 0.1 | 0.3 | 0.4 | 0.31 | 0.415 | 0.315 | 0.41 |
| Total thickness | mm | 0.51 | 0.58 | 0.51 | 0.57 | 0.54 | 0.585 | 0.535 | 0.6 |
| Outer diameter of insulated wire | mm | 2.25 | 2.39 | 2.25 | 2.37 | 2.31 | 2.4 | 2.3 | 2.43 |
| DC stability test | Hour | Not less than 240 | Not less than 240 | Not less than 240 | Not less than 240 | Not less than 240 | Not less than 240 | Not less than 240 | Not less than 240 |
| Flame retardancy | VFT | ◎ | ◎ | ◎ | ◎ | ◎ | ◎ | ○ | ○ |
|  | VTFT | ◎ | ○ | ◎ | ◎ | ○ | ○ | Δ | Δ |
| Overall evaluation |  | ◎ | ◎ | ◎ | ◎ | ◎ | ◎ | ○ | ○ |

TABLE 5

|  |  | Comparative Example |
|---|---|---|
| Thickness of electrical insulating layer | mm | 0.3 |
| Thickness of flame-retardant layer | mm | 0.4 |
| Total thickness | mm | 0.7 |
| Outer diameter of insulated wire | mm | 2.62 |
| DC stability test | Hour | Not less than 240 |
| Flame retardancy | VFT | ◎ |
|  | VTFT | ◎ |
| Overall evaluation |  | X |

Evaluation of Insulated Wire

The obtained insulated wires were evaluated by the following methods. The Tables 4 and 5 show the evaluation results.

(1) Electrical Characteristics Test

A 300V DC stability test was conducted in accordance with EN 50305.6.7. Voltage was applied to the insulated wires in 3% salt water at 85° C., and time to insulation breakdown was measured. The wires with no short-circuit for 240 hours were regarded as "Pass" and those short-circuited within 240 hours were regarded as "Fail".

(2) Flame-Retardant Test (VFT)

A vertical flame test (VFT) was conducted as a flame-retardant test in accordance with EN 60332-1-2. 600 mm-long insulated wires were held vertical and a flame was applied thereto for 60 seconds. The wires passed the test (◎: excellent) when the fire was extinguished within 30 seconds after removing the flame, the wires passed the test (○: acceptable) when the fire was extinguished within 60 seconds, and the wires failed the test (X) when the fire was not extinguished within 60 seconds.

(VTFT)

A vertical tray flame test (VTFT) was conducted based on EN 50266-2-4. In detail, seven 3.5-meter insulated wires were bundled into one, and eleven bundles were vertically arranged at equal intervals and were burnt for 20 minutes. The char length of not more than 2.5 m from the lower end after self-extinction was set as the target. The wires with a char length of not more than 1.5 m were regarded as "Pass (◎: excellent)", those with a char length of not more than 2.5 m were regarded as "Pass (○: acceptable)", and those with a char length of more than 2.5 m were regarded as "Fail (X)".

Overall Evaluation

The overall evaluation was rated as "Pass (◎)" when all evaluation results in the above-mentioned tests were "Pass", rated as "Pass (○)" when passed the DC stability test and VFT but failed VTFT, and rated as "Fail (X)" when failed any one of the DC stability test and VFT.

Evaluation Result

As shown in Table 3, it was confirmed that in Examples 9 to 16, the high levels of DC stability and flame retardancy can be both achieved while using cheaper materials than the conventional insulated wires and reducing the outer diameter of the wires.

On the other hand, in Comparative Example in which the insulated wire having a conventional structure was made by providing the flame-retardant layer around the insulation layer, it was confirmed that high-level and well-balanced DC stability and flame retardancy were obtained by forming each layer with a large thickness, but the outer diameter of the wire was excessively large.

The invention is not intended to be limited to the embodiments and Examples, and the various kinds of modifications can be implemented.

The invention claimed is:

1. An insulated wire, comprising:
   a conductor;
   a flame-retardant inner layer that is provided around the conductor and includes a metal hydroxide;
   a water ingress prevention layer provided around the flame-retardant inner layer; and
   a flame-retardant outer layer provided around the water ingress prevention layer and including a metal hydroxide,
   wherein the water ingress prevention layer includes a high-density polymer film or a low-density polymer film.

2. The insulated wire according to claim 1, wherein the water ingress prevention layer comprises a high-density polymer film or low-density polymer film that has a thickness of not less than 10 μm and not more than 200 μm.

3. The insulated wire according to claim 2, wherein the high-density polymer film is selected from the group consisting of high-density polyethylene (HDPE), polytetrafluoroethylene (PTFE) and chlorine-based resin.

4. A cable, comprising the insulated wire according to claim 1.

5. The insulated wire according to claim 1, wherein a content of the metal hydroxide in the flame-retardant inner layer is not less than 80 parts by mass and not more than 250 parts by mass with respect to 100 parts by mass of a base polymer constituting the flame-retardant inner layer.

6. The insulated wire according to claim 1, wherein a moisture vapor transmission rate of the water ingress prevention layer is not more than 50 $gm^{-2}$·day as measured by a moisture sensor (Lyssy method).

7. The insulated wire according to claim 1, wherein a content of the metal hydroxide in the flame-retardant outer layer is not less than 80 parts by mass and not more than 250 parts by mass with respect to 100 parts by mass of a base polymer constituting the flame-retardant outer layer.

8. The insulated wire according to claim 1, wherein an inner surface of the water ingress prevention layer contacts an outer surface of the flame-retardant inner layer, and a thickness of the water ingress prevention layer is less than a thickness of the flame-retardant inner layer and less than a thickness of the flame-retardant outer layer.

9. The insulated wire according to claim 1, wherein the water ingress prevention layer consists essentially of a high-density polymer film or a low-density polymer film.

10. The insulated wire according to claim 1, wherein the metal hydroxide comprises at least one of a silane coupling agent surface treatment, a titanate-based coupling agent surface treatment and a fatty acid surface treatment.

11. A multilayer insulated wire, comprising:
a conductor;
a flame-retardant inner layer that is provided around the conductor and includes a metal hydroxide;
a water ingress prevention layer provided around the flame-retardant inner layer; and
a flame-retardant outer layer provided around the water ingress prevention layer and including a metal hydroxide,
wherein the flame-retardant outer layer and the flame-retardant inner layer comprise a resin composition mainly comprising a polyolefin, and
wherein the water ingress prevention layer includes a resin composition mainly comprising a polyethylene.

12. The multilayer insulated wire according to claim 11, wherein an outer diameter of the conductor is not less than 1.20 mm and not more than 5.5 mm.

13. The multilayer insulated wire according to claim 11, wherein a total thickness of the flame-retardant inner layer, the water ingress prevention layer and the flame-retardant outer layer is not less than 0.4 mm and not more than 0.65 mm.

14. The multilayer insulated wire according to claim 11, wherein a DC stability of the multilayer insulated wire is satisfied such that short circuit does not occur even after applying DC voltage in salt water at 85° C. for 240 hours, and
wherein a flame retardancy of the multilayer insulated wire is satisfied such that fire is extinguished within 60 seconds after removal of flame in flame retardant test.

15. A cable, comprising the multilayer insulated wire according to claim 11.

16. The multilayer insulated wire according to claim 11, wherein a content of the metal hydroxide in the flame-retardant inner layer is not less than 80 parts by mass and not more than 250 parts by mass with respect to 100 parts by mass of a base polymer constituting the flame-retardant inner layer.

17. The multilayer insulated wire according to claim 11, wherein a moisture vapor transmission rate of the water ingress prevention layer is not more than 50 $gm^2$ day as measured by a moisture sensor (Lyssy method).

18. The multilayer insulated wire according to claim 11, wherein a content of the metal hydroxide in the flame-retardant outer layer is not less than 80 parts by mass and not more than 250 parts by mass with respect to 100 parts by mass of a base polymer constituting the flame-retardant outer layer.

19. The multilayer insulated wire according to claim 11, wherein the polyethylene comprises high-density polyethylene (HDPE), low-density polyethylene (LDPE), medium-density polyethylene and linear low-density polyethylene.

20. An insulated wire, comprising:
a conductor having an outer diameter in a range from 1.2 mm to 5.5 mm;
an inner layer formed around the conductor and including a base polymer and at least 80 parts by mass of metal hydroxide with respect to 100 parts by mass of the base polymer;
a polymer layer formed around the inner layer and preventing ingress of water from outside the insulated wire to the inner layer, and having a thickness in a range from 10 μm to 200 μm; and
an outer layer formed around the polymer layer and including a base polymer and at least 80 parts by mass of metal hydroxide with respect to 100 parts by mass of the base polymer,
wherein a total thickness of the inner layer, the polymer layer and the outer layer is 0.65 mm or less.

* * * * *